Figure 1:
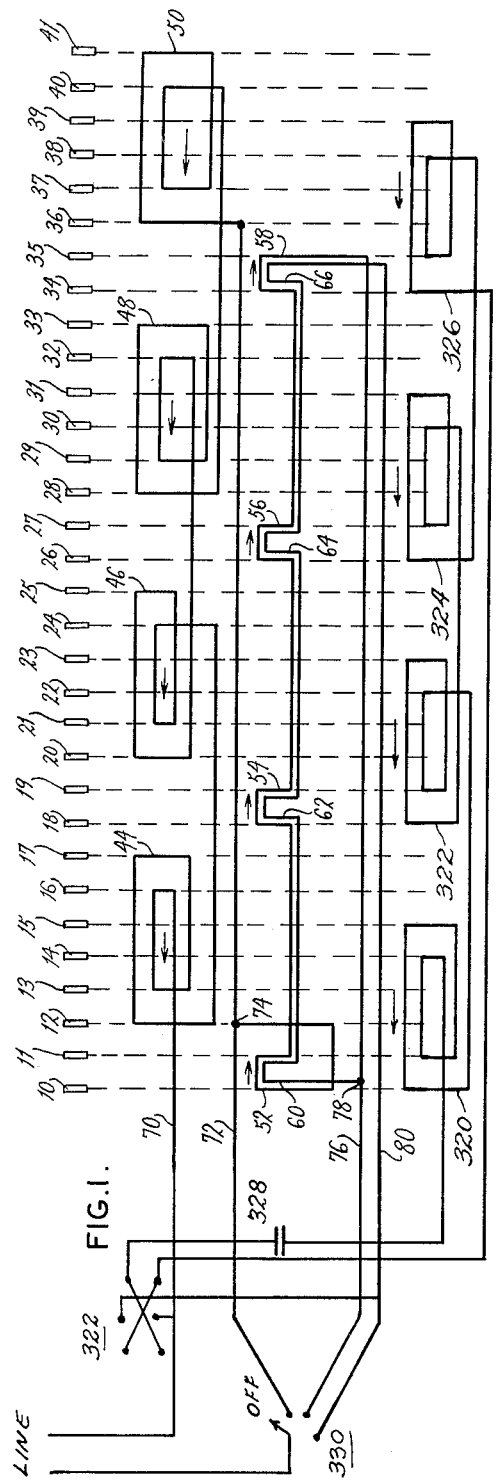

Aug. 30, 1955 S. WITT 2,716,725
DYNAMO ELECTRIC MACHINES
Filed June 8, 1953 2 Sheets-Sheet 1

INVENTOR.
STANLEY WITT
BY
Rey Eilers
ATTORNEY

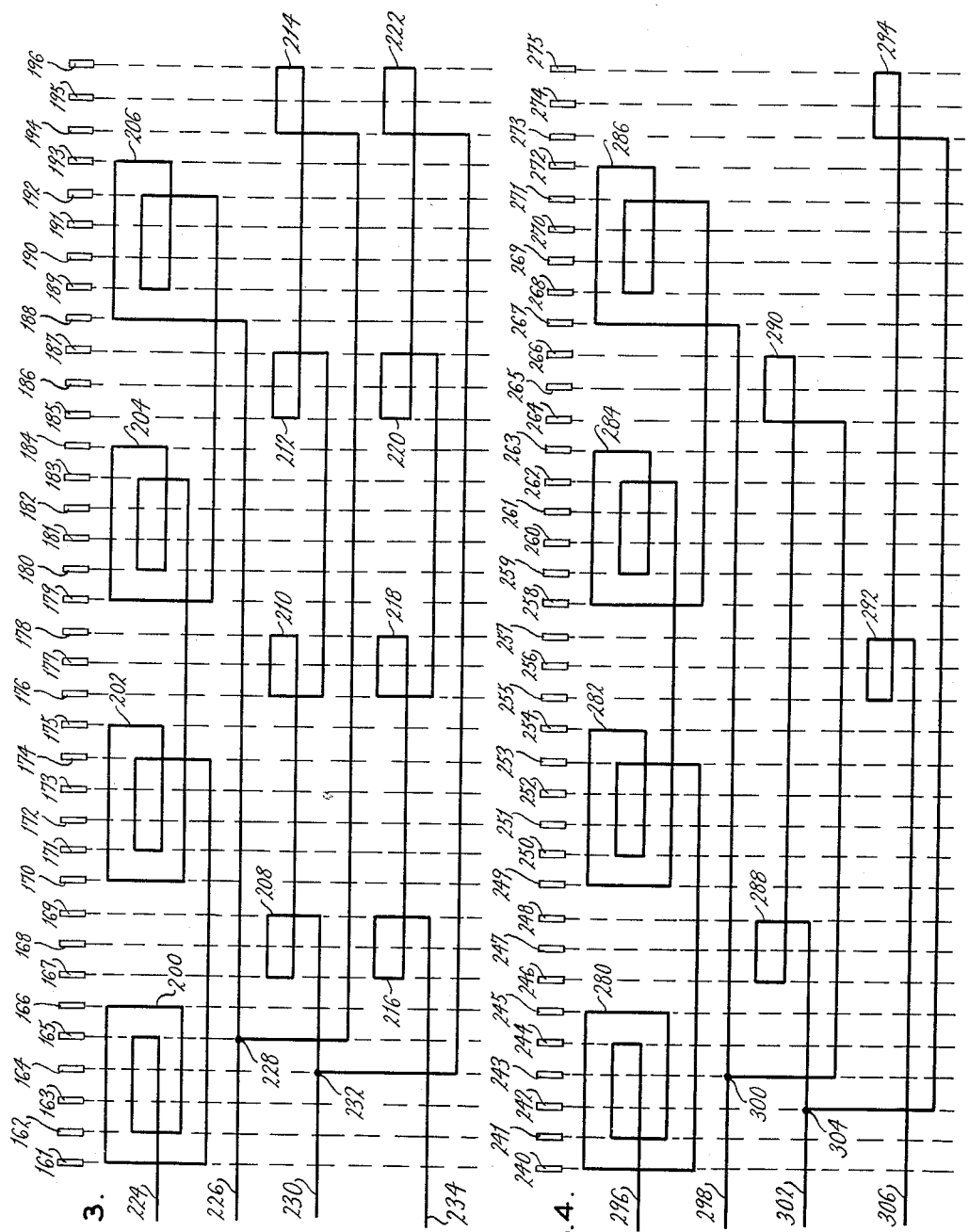

United States Patent Office 2,716,725
Patented Aug. 30, 1955

2,716,725

DYNAMOELECTRIC MACHINES

Stanley Witt, St. Louis, Mo., assignor to Century Electric Company, a corporation of Missouri Application June 8, 1953, Serial No. 360,133

13 Claims. (Cl. 318—220)

This invention relates to improvements in dynamoelectric machines. More particularly, this invention relates to improvements in multi-speed electric motors.

It is therefore an object of the present invention to provide an improved multi-speed electric motor.

It is frequently desirable to vary the speed of electric motors; and in recognition of that fact, a number of motors have been proposed and built that could be operated at different speeds. Some of those motors operated on the principle that the motor torque varies as the square of the applied voltage varies; and those motors have used voltage-controlling devices to vary the applied voltage. Other such motors operated on the principle that the motor torque varies as the square of the magnetic flux of the motor varies. The magnetic flux of a motor will vary inversely as the number of turns of the windings of the motor is varied; and thus it is possible, by varying the number of turns of the windings, to vary the magnetic flux and thus the speed of the motor. Consequently those other multi-speed motors have employed windings which had taps that permitted the energization of varying numbers of turns of those windings. One group of turns in each such multi-speed motor constitutes the main running winding of that motor, and the remaining groups of turns in that motor constitute tapped windings that can be selectively energized to vary the total number of turns and thus vary the magnetic flux and the speed of that motor. The tapped windings of each such multi-speed motor are disposed in the same slots with the main running winding of that motor. Where the multi-speed motors are large, and where those motors are wound to generate only a limited number of poles, it is usually not too difficult to distribute the main running windings and the tapped windings in the slots of those motors. However, where the multi-speed motors are small, and where those motors are wound to generate a large number of poles, it is difficult to distribute the main running windings and the tapped windings in the slots of those motors.

To provide satisfactory distribution of the groups of turns of the main running windings and of the tapped windings of small multi-speed motors that utilize a large number of poles, it has been deemed necessary to provide an unusually large number of slots in the stators of those motors. The large number of slots in those stators usually mean that special dies and punches must be used in making the laminations of those stators; and the large number of slots in those stators usually means that each of the windings of those motors will have a larger than usual number of groups of turns. The need of special dies and punches increases the cost of making the stator cores of the multi-speed motors, and the need of greater than usual number of groups of turns for the various windings of those motors increases the cost of forming and installing those windings. For these reasons, prior multi-speed motors that utilized tapped windings to vary the number of turns and thus vary the magnetic flux and the speed of those motors are objectionable. The present invention obviates those objections by providing a multi-speed electric motor which has a main running winding disposed in certain of the slots of the stator and which has selectively energizable windings disposed in the other slots of the stator. By placing the selectively energizable windings in other slots, the present invention greatly simplifies the forming and installing of all of the windings of the motor. Moreover, it reduces the cost of manufacture of that motor. It is therefore an object of the present invention to provide a multi-speed electric motor which has a main running winding disposed in certain of the slots in the stator of that motor and which has selectively energizable windings disposed in other of the slots of that stator.

The main running winding of the multi-speed electric motor provided by the present invention is a consequent pole winding, and thus it requires fewer slots than an alternate pole winding would require. Similarly, the selectively energizable windings of that motor are consequent pole windings, and thus they require fewer slots than the usual alternate pole tapped windings require. As a result, the multi-speed electric motor provided by the present invention requires fewer slots in the stator than prior multi-speed tapped winding motors require. It is therefore an object of the present invention to provide a multi-speed electric motor with a consequent pole main running winding and consequent pole selectively energizable windings.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

Figure 2:
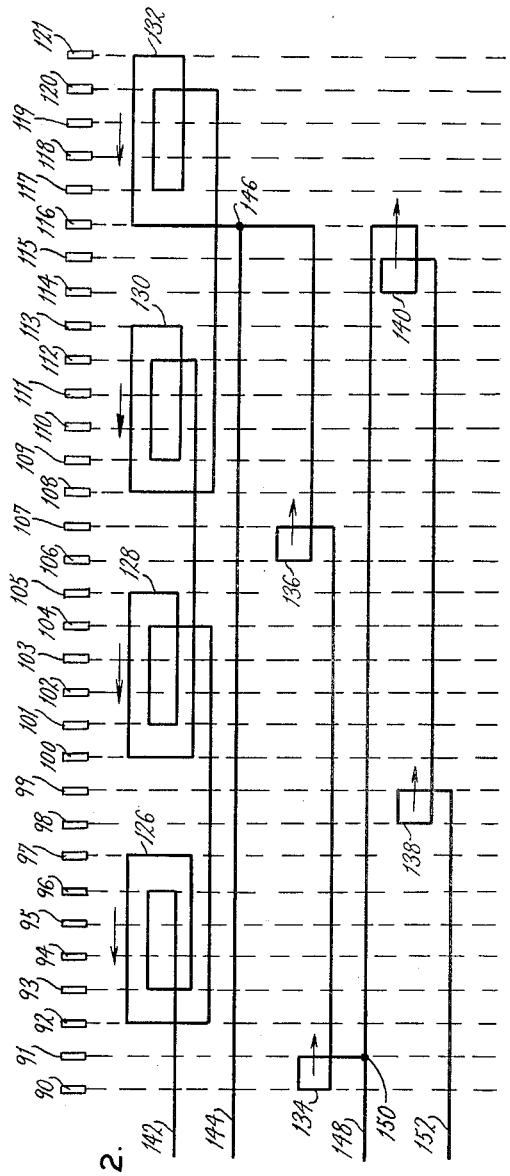

In the drawing,

Fig. 1 is a schematic diagram of the main running winding and the selectively energizable windings of a three speed, eight pole motor which has thirty two slots in the stator thereof, Fig. 2 is a schematic diagram of the main running winding and the selectively energizable windings of a three speed, eight pole motor which has thirty two slots in the stator thereof and which has the selectively energizable windings spaced circumferentially apart from each other, Fig. 3 is a schematic diagram of the main running winding and the selectively energizable windings of a three speed, eight pole motor which has thirty six slots in the stator thereof, and Fig. 4 is a schematic diagram of the main running winding and the selectively energizable windings of a three speed, eight pole motor which has thirty six slots in the stator thereof and which has the selectively energizable windings spaced circumferentially apart from each other.

Referring to the drawing in detail, the numerals 10 through 41 denote the thirty two slots in the stator of a multi-speed electric motor that is made in accordance with the principles and teachings of the present invention. That stator and the slots thereof can be of standard and usual design and construction. That stator will be suitably mounted in a frame, and a rotor will be mounted for rotation relative to the stator and the frame.

A main running winding is provided for the motor of the present invention and that winding has a number of circumferentially spaced groups of turns 44, 46, 48 and 50. These groups of turns will be wound in the form of coils, and they will be disposed in spaced groups of slots of the stator; thus, the group of turns 44 will be in slots 12, 13, 16 and 17, the group of turns 46 will be in slots 20, 21, 24 and 25, the group of turns 48 will be in slots 28, 29, 32 and 33, and the group of turns 50 will be in the slots 36, 37, 40 and 41. The groups of turns 44, 46, 48 and 50 will provide four wound poles in the groups of slots 12 through 17, 20 through 25, 28 through 33, and 36 through 41, and will provide four consequent poles in the groups of intermiate slots 10 and 11, 18 and 19, 26 and 27, and 34 and 35. The four wound poles will have the same polarity, and the four consequent poles will have a polarity opposite to that of the wound poles.

A starting winding of usual design and construction will be provided, and that winding will usually be displaced from the groups of turns of the main running winding. Thus, the turns of the starting winding are wound in the form of coils; the group of turns 320 being disposed in slots 10 and 11, and 14 and 15, the group of turns 322 being disposed in slots 18 and 19, and 22 and 23, the group of turns 324 being disposed in slots 26 and 27, and 30 and 31, and the groups of turns 326 being disposed in slots 34 and 35, and 38 and 39. One type of starting winding that has been used in the multi-speed motor of the present invention and has been found satisfactory is a phase winding. The condenser 328 is connected in series with that phase winding.

A selectively energizable winding is provided; and that winding has a number of groups of turns 52, 54, 56 and 58. The group of turns 52 is disposed in intermediate slots 10 and 11, the group of turns 54 is disposed in intermediate slots 18 and 19, the group of turns 56 is disposed in intermediate slots 26 and 27, and the group of turns 58 is disposed in intermediate slots 34 and 35. The groups of turns 52, 54, 56 and 58 can provide four wound poles in the intermediate slots 10 and 11, 18 and 19, 26 and 27, and 34 and 35, and can provide four consequent poles in the groups of slots 12 through 17, 20 through 25, 28 through 33, and 36 through 41. The four wound poles of the selectively energizable winding will have the polarity of the four consequent poles of the main running winding, and the four consequent poles of the selectively energizable winding will have the polarity of the four wound poles of the main running winding.

A second selectively energizable winding is provided; and that winding has a number of groups of turns 60, 62, 64 and 66. The group of turns 60 is disposed in intermediate slots 10 and 11, the group of turns 62 is disposed in intermediate slots 18 and 19, the group of turns 64 is disposed in intermediate slots 26 and 27, and the group of turns 66 is disposed in intermediate slots 34 and 35. The groups of turns 60, 62, 64 and 66 can provide four wound poles in the intermediate slots 10 and 11, 18 and 19, 26 and 27, and 34 and 35, and can provide four consequent poles in the groups of slots 12 through 17, 20 through 25, 28 through 33, and 36 through 41. The four wound poles of the second selectively energizable winding will have the polarity of the four wound poles of the first selectively energizable winding and will have the polarity of the four consequent poles of the main running winding; and the four consequent poles of the second selectively energizable winding will have the polarity of the four consequent poles of the first selectively energizable winding and will have the polarity of the wound poles of the main running winding.

One terminal of the main running winding is denoted by the numeral 70 and the other terminal of that winding is denoted by the numeral 72. A junction 74 is provided adjacent the terminal 72, and one terminal of the first selectively energizable winding is connected to that junction. The other terminal of that selectively energizable winding is denoted by the numeral 76. A junction 78 is provided adjacent the terminal 76, and one terminal of the second selectively energizable winding is connected to that junction. The other terminal of the second selectively energizable winding is denoted by the numeral 80. A suitable switch 330 has its movable contact connected to one side of line and has three of its four fixed contacts connected to the terminals 72, 76 and 80. The fourth fixed contact of the switch 330 serves as an "off" position. The terminal 70 of the main running winding is permanently connected to the other side of line. A two pole double throw reversing switch 332 connects the starting winding to said other side of line through the condenser 328. Appropriate setting of that switch controls the direction of rotation of the rotor of the motor. Proper setting of switch 330 will selectively energize the main running winding, the main running winding and the first selectively energizable winding, or the main running winding and both of the selectively energizable windings. Thus, when the switch 330 connects terminals 70 and 72 to the source of power, current will flow from terminal 70 through the groups of turns 44, 46, 48 and 50 of the main running winding to the terminal 72. When terminals 70 and 76 are connected to the source of power, current will flow from terminal 70 through the groups of turns 44, 46, 48 and 50 of the main running winding to junction 74, and then through the groups of turns 52, 54, 56 and 58 of the first selectively energizable winding to the terminal 76. When terminals 70 and 80 are connected to the source of power, current will flow from terminal 70 through the groups of turns 44, 46, 48 and 50 of the main running winding to junction 74, then through the groups of turns 52, 54, 56 and 58 of the first selectively energizable winding to junction 78, and then through the groups of turns 60, 62, 64 and 66 to junction 80.

When the terminals 70 and 72 are connected to the source of power, the least number of turns will be energized and thus the magnetic flux will be at maximum value. Since the motor torque varies as the square of the magnetic flux, the motor will operate at its highest speed when terminals 70 and 72 are connected to the source of power. If a slower speed is desired, the switch 330 will be set to connect the terminals 70 and 76 to the source of power. This will increase the number of turns that are energized and will thus correspondingly reduce the magnetic flux. When a still slower speed is desired, the switch 330 will be set to connect the terminals 70 and 80 to the source of power; thus energizing the maximum number of turns and thereby obtaining the minimum magnetic flux.

In one particular embodiment of the present invention, the group of turns 44 was formed as two coils which had seventy turns each. The turns of one of the coils were disposed in the slots 12 and 17, and the turns of the other coil were disposed in the slots 13 and 16. The group of turns 44 were formed from number twenty wire, and that group of turns contained a total of one hundred and forty turns. The groups of turns 46, 48 and 50 also were formed as two coils of seventy turns each; and the turns in these groups of turns were formed of number twenty wire. One coil of the group of turns 46 was disposed in slots 20 and 25, and the other coil of that group of turns was disposed in the slots 21 and 24. One coil of the group of turns 48 was disposed in slots 28 and 33, and the other coil of that group of turns was disposed in the slots 29 and 32. One coil of the group of turns 50 was disposed in the slots 36 and 41, and the other coil of that group of turns was disposed in slots 37 and 40. The groups of turns 44, 46, 48 and 50 thus provided a total of five hundred and sixty turns which generated four wound poles and four consequent poles. When the four groups of turns 44, 46, 48 and 50 were energized, as by connecting the terminals 70 and 72 to a source of power, the motor operated at seven hundred and eighty R. P. M. This was a one sixth horsepower sixty cycle one hundred and fifteen volt motor.

The groups of turns 52, 54, 56 and 58 each consisted of sixty five turns of number twenty three wire. The groups of turns 52, 54, 56, and 58 of the first energizable winding thus provided a total of two hundred and sixty turns and those turns generated four wound poles and four consequent poles. When the main running winding and the first energizable winding are energized, as by connecting terminals 70 and 76 to a suitable source of power, a total of eight hundred and twenty turns are energized. These turns will operate the motor at a speed of six hundred and eighty R. P. M.

The groups of turns 60, 62, 64, and 66 each constitute twenty five turns of number twenty three wire. Thus the groups of turns 60, 62, 64 and 66 of the second energizable winding can provide a total of one hundred turns and those turns will generate four wound poles and four consequent poles. When the main running winding and both of the energizable windings are energized, as by connecting terminals 70 and 80 to a source of power, those windings will provide a total of nine hundred and twenty energized turns. These turns will rotate the motor at a speed of five hundred and sixty R. P. M.

In the particular embodiment the present invention, the starting winding was a phase winding which was connected in series with a capacitor 328. That winding had four spaced groups of turns 320, 322, 324 and 328, and each of those spaced groups of turns was wound as two coils. One of the coils of the first of those groups of turns was disposed in slots 10 and 15, and the other coil of that first group of turns 320 was disposed in slots 11 and 14. The first coil of the second group of turns 322 of the starting winding was disposed in slots 18 and 23, and the second coil of that group of turns was disposed in slots 19 and 22. The first coil of the third group of turns 324 of the starting winding was disposed in slots 26 and 31 and the other coil of that group of turns was disposed in slots 27 and 30. The first coil of the last group of turns 326 of the starting winding was disposed in slots 34 and 39 and the other coil of that group of turns was disposed in slots 35 and 38. Each coil of the groups of turns was formed from one hundred and ninety turns of number twenty-eight wire, and therefore each group of turns included three hundred and eighty turns. As a result, the starting winding provided fifteen hundred and twenty turns and those turns generated four wound poles and four consequent poles.

Fig. 2 discloses the thirty-two slots of a multi-speed electric motor which is very similar to the motor of Fig. 1. The slots in Fig. 2 are denoted by the numerals 90 through 121. A main running winding has four groups of turns 126, 128, 130 and 132. Each of these groups of turns is wound as two coils and the first of the group of turns 126 is disposed in the slots 92 and 97. The other coil of that group of turns is disposed in the slots 93 and 96. One coil of the group of turns 128 is disposed in the slots 100 and 105 and the other coil of that group of turns is disposed in the slots 101 and 104. One coil of the group of turns 130 is disposed in the slots 108 and 113, and the other coil of that group of turns is disposed in the slots 109 and 112. One coil of the group of turns 132 is disposed in the slots 116 and 121, and the other coil of that group of turns is disposed in the slots 117 and 120. the groups of turns 126, 128, 130 and 132 will provide four wound poles and four consequent poles; the wound poles being concentrated in the slots 92 through 97, 100 through 105, 108 through 113 and 116 through 121. The four consequent poles will be concentrated in the slots 90 and 91, 98 and 99, 106 and 107, and 114 and 115.

Two selectively energizable windings are provided in the motor of Fig. 2, but those windings are concentrated in two groups of turns each rather than in four groups of turns each. Thus, the first selectively energizable winding has a spaced group of turns 134 and a spaced group of turns 136. The group of turns 134 is disposed in slots 90 and 91 and the group of turns 136 is disposed in the slots 106 and 107. These groups of turns will generate two wound poles and two consequent poles; the wound poles having the same polarity as the consequent poles of the main running winding, and the consequent poles of the first energizable winding having the same polarity as the wound poles of the main running winding.

The second selectively energizable winding has two groups of turns 138 and 140. The group of turns 138 is disposed in the slots 98 and 99 and the group of turns 140 is disposed in the slots 114 and 115. The groups of turns 138 and 140 generate two wound poles and two consequent poles. The wound poles of the second selectively energizable winding will have the same polarity as the consequent poles of the main running winding and the consequent poles of the second selectively energizable winding will have the same polarity as the wound poles of the main running winding.

The main running winding has two terminals 142 and 144 which can be selectively connected to a source of power power by a switch, not shown. A junction 146 is disposed between the terminal 144 and the group of turns 132. One terminal of the first selectively energizable winding is connected to the junction 146 and the other terminal of that winding is denoted by the numeral 148. A junction 150 is provided intermediate the terminal 148 and the group of turns 134. One terminal of the second selectively energizable winding is connected to the junction 150 and the other terminal of that winding is denoted by the numeral 152.

The winding of the motor of Fig. 2 is wound more easily than the winding of the motor of Fig. 1 because only one coil of the running winding need be inserted in the slots which contain the coils of the phase winding. Thus, in the motor of Fig. 2, slots 90 and 91 will have only the group of turns 134 and turns of two of the coils of the phase winding, whereas the slots 10 and 11 of Fig. 1 had the group of turns 52 and 60 in addition to the two coils of one group of turns of the phase winding. The magnetic flux in the motor of Fig. 2 will not be as well distributed as the magnetic flux of the motor of Fig. 1, but the motor of Fig. 2 will operate very satisfactorily.

In Fig. 3, the numerals 161 through 196 denote the thirty six slots of a multi-speed electric motor. The main running winding of this motor has four groups of turns 200, 202, 204 and 206. Each of these groups of turns is wound as two coils, and one coil of the group of turns 200 is disposed in slots 161 and 166 and the other coil of that group of turns is disposed in the slots 162 and 165. One coil of the group of turns 202 is disposed in the slots 170 and 175 and the other coil of that group of turns is disposed in the slots 171 and 174. One coil of the group of turns 204 is disposed in the slots 179 and 184, and the other coil of that group of turns is disposed in the slots 180 and 183. One coil of the group of turns 206 is disposed in the slots 188 and 193, and the other coil of that group of turns is disposed in the slots 189 and 192. The spaced groups of turns, 200, 202, 204 and 206 generate four wound poles and four consequent poles. The wound poles are concentrated in slots 161 through 166, 170 through 175, 179 through 184 and 188 through 193. The consequent poles will be concentrated in slots 167 through 169, 176 through 178, 185 through 187 and 194 through 196.

A selectively energizable winding is provided for the motor of Fig. 3, and that winding has four groups of turns 208, 210, 212 and 214. Each of these groups of turns is wound as a coil and the turns of the coil 208 are disposed in slots 167 and 169, the turns of the coil 210 are disposed in the slots 176 and 178, the turns of the coil 212 are disposed in the slots 185 and 187, and the turns of the coil 214 are disposed in the slots 194 and 196. These four coils will generate four wound poles and four consequent poles. The wound poles will be concentrated in the slots 167–169, 176–178, 185–187, and 194–196; and they will have the polarity of the consequent poles of the main running winding. The four coils 208, 210, 212 and 214 will generate four consequent poles and those poles will be concentrated in the slots 161–166, 170–175, 179–184, and 188–193; and they will have the polarity of the wound poles of the main running winding.

A second selectively energizable winding is provided for the motor of Fig. 3, and that winding has four groups of turns 216, 218, 220, and 222. The turns of the groups of turns 216, 218, 220, and 222 are formed as coils and the turns of those coils are disposed in slots 167 and 169, 176 and 178, 185 and 187, and 194 and 196. The second selectively energizable winding generates four wound poles and four consequent poles; the wound poles having the polarity of the consequent poles of the main running winding and the consequent poles of the second selectively energizable winding having the polarity of the four wound poles of the main running winding.

The main running winding has terminals 224 and 226. A junction 228 is intermediate the terminal 226 and the group of turns 206. One terminal of the first selectively energizable winding is connected to the junction 228, and the other terminal of that winding is denoted by the numeral 230. A junction 232 is disposed intermediate the terminal 230 and the group of turns 208, and one terminal of the second selectively energizable winding is connected to the junction 232. The other terminal of the second selectively energizable winding is denoted by the numeral 234. When the terminals 224 and 226 are connected to a source of power by a selector switch, not shown, the motor will have the minimum number of turns and will operate at its highest speed. If a lower speed is desired, terminals 224 and 230 will be connected to that source of power. If still slower rotation is desired, the terminals 224 and 234 will be connected to that source of power; and thereupon the largest number of turns and thus the smallest amount of magnetic flux will be generated.

The motor of Fig. 3 is very similar to the motor of Fig. 1 since each of those motors has the three running windings thereof formed as four spaced groups of turns. Moreover, each of those spaced groups of turns generates a wound pole and a consequent pole. The only difference between the motors of Figs. 1 and 3 is that a larger number of slots are provided in the motor of Fig. 3 and thus the groups of turns of the second and third running windings span three slots each rather than two slots each as is the case in the motor of Fig. 1.

In Fig. 4 the thirty six slots of the stator of a multi-speed electric motor are denoted by the numerals 240 through 275. A main running winding has four groups of turns 280, 282, 284 and 286. Each of these groups of turns is wound as two coils and the turns of those coils are disposed in slots 240 and 245, 241 and 244, 249 and 254, 250 and 253, 258 and 263, 259 and 262, 267 and 272, and 268 and 271. The groups of turns 280, 282, 284 and 286 are comparable to the groups of turns of the main running windings of the motors of Figs. 1-3, and they will perform in the same manner.

A selectively energizable winding has two spaced groups of turns 288 and 290. These spaced groups of turns are disposed in slots 246 and 248, and 264 and 266. The spaced groups of turns 288 and 290 are comparable to the spaced groups of turns 134 and 136 of the motor of Fig. 2; the only difference being that the groups of turns 288 and 290 span three slots each while the groups of turns 134 and 136 span two slots each.

A second selectively energizable winding is provided for the motor of Fig. 4, and that motor has two spaced groups of turns 292 and 294. The spaced groups of turns 292 and 294 are disposed in slots 255 and 257, and 273 and 275. The spaced groups of turns 292 and 294 are comparable to the spaced groups of turns 138 and 140 of the motor of Fig. 2; the principal difference being that the groups of turns 292 and 294 span three slots each whereas the groups of turns 138 and 140 span two slots each.

To attain maximum speed with the motor of Fig. 4, the terminals 296 and 298 of the main winding are connected to a source of power. To attain intermediate speed for the motor of Fig. 4, the terminals 296 and 302 are connected to that source of power; current passing through the main running winding and then through the junction 300 into the first selectively energizable winding. When the slowest speed is desired, the terminals 296 and 306 are connected to the said source of power; current flowing through the main running winding and through the first selectively energizable winding and then through the junction 304 to the second selectively energizable winding.

The drawing and accompanying description have disclosed three speed motors because such motors are the most popular in the fractional horsepower field. However, two speed motors could be made quite readily by eliminating the second selectively energizable windings of the motors of Figs. 1 and 3. Motors which have four or more speeds can be made by disposing three or more selectively energizable windings in the slots 10 and 11, 18 and 19, 26 and 27 and 34 and 35 of Fig. 1 and in slots 167–169, 176–178, 185–187, and 194–196 of Fig. 3. Additional selectively energizable windings could also be disposed in the slots 90 and 91, 98 and 99, 106 and 107, and 114 and 115 of Fig. 2, and in slots 246–248, 255–257, 264–266, and 273–275 of Fig. 4 to attain four or more speeds.

Whereas the drawing and accompanying description have shown and described several preferred embodiments of the present invention, it should be apparent to those skilled in the art that various changes may be made in the form of the invention without affecting the scope thereof.

What I claim is:

1. A multi-speed electric motor that has a rotor, a stator, a plurality of wind-receiving slots in said stator, a main running winding that has the turns thereof formed as spaced groups of turns, said spaced groups of turns being disposed in groups of slots in said stator that are spaced apart by intermediate slots, said spaced groups of turns generating wound poles at said groups of slots and generating consequent poles at said intermediate slots, and a selectively energizable winding that has the turns thereof formed as spaced groups of turns, said spaced groups of turns of said selectively energizable winding being disposed in said intermediate slots, said spaced groups of turns of said selectively energizable winding generating wound poles at said intermediate slots and generating consequent poles at said spaced groups of slots, said spaced groups of turns of said selectively energizable winding generating wound poles that have the polarity of the consequent poles of said main running winding and generating consequent poles that have the polarity of the wound poles of said main running winding.

2. A multi-speed electric motor as claimed in claim 1 wherein said intermediate slots are grouped in spaced groups that alternate with said groups of slots.

3. A multi-speed electric motor as claimed in claim 1 wherein said intermediate slots are grouped in spaced groups that alternate with said groups of slots, and wherein the number of slots in each of said groups of slots is greater than the number of slots in each group of intermediate slots.

4. A multi-speed electric motor that has a rotor, a stator, a plurality of winding-receiving slots in said stator, a main running winding that has the turns thereof formed as spaced groups of turns, said spaced groups of turns being disposed in groups of slots in said stator that are spaced apart by intermediate slots, said spaced groups of turns generating wound poles at said groups of slots and generating consequent poles at said intermediate slots, and a selectively energizable winding that has the turns thereof formed as spaced groups of turns, said spaced groups of turns of said selectively energizable winding being disposed in said intermediate slots, said spaced groups of turns of said selectively energizable winding generating wound poles at said intermediate slots and generating consequent poles at said spaced groups of slots, said spaced groups of turns of said selectively energizable winding generating wound poles that have the polarity of the consequent poles of said main running winding and generating consequent poles that have the polarity of the wound poles of said main running winding, said spaced groups of turns of said main running winding occupying more than one half of the slots in said stator.

5. A multi-speed electric motor that has a rotor, a stator, a plurality of winding-receiving slots in said stator, a main running winding that has the turns thereof formed as spaced groups of turns, said spaced groups of turns being disposed in groups of slots in said stator that are spaced apart by intermediate slots, said spaced groups of turns generating wound poles at said groups of slots and generating consequent poles at said intermediate slots, and a selectively energizable winding that has the turns thereof formed as spaced groups of turns, said spaced groups of turns of said selectively energizable winding being disposed in said intermediate slots, said spaced groups of turns of said selectively energizable winding generating wound poles at said intermediate slots and generating consequent poles at said spaced groups of slots, said spaced groups of turns of said selectively energizable winding generating wound poles that have the polarity of the consequent poles of said main running winding and generating consequent poles that have the polarity of the wound poles of said main running winding, said main running winding being selectively connectible directly across a source of voltage and being selectively connectible in series with said selectively energizable winding across said source of voltage.

6. A multi-speed electric motor that has a rotor, a stator, a plurality of winding-receiving slots in said stator, a main running winding that has the turns thereof formed as spaced groups of turns, said spaced groups of turns being disposed in groups of slots in said stator that are spaced apart by intermediate slots, said spaced groups of turns generating wound poles at said groups of slots and generating consequent poles at said intermediate slots, and a selectively energizable winding that has the turns thereof formed as spaced groups of turns, said spaced groups of turns of said selectively energizable winding being disposed in said intermediate slots, said spaced groups of turns of said selectively energizable winding generating wound poles at said intermediate slots and generating consequent poles at said spaced groups of slots, said spaced groups of turns of said selectively energizable winding generating wound poles that have the polarity of the consequent poles of said main running winding and generating consequent poles that have the polarity of the wound poles of said main running winding, the total number of turns of said selectively energizable winding being less than the total number of turns of said main running winding.

7. A multi-speed electric motor that has a rotor, a stator, a plurality of winding-receiving slots in said stator, a main running winding that has the turns thereof formed as spaced groups of turns, said spaced groups of turns being disposed in groups of slots in said stator that are spaced apart by intermediate slots, said spaced groups of turns generating wound poles at said groups of slots and generating consequent poles at said intermediate slots, a selectively energizable winding that has the turns thereof formed as spaced groups of turns, said spaced groups of turns of said selectively energizable winding being disposed in certain of said intermediate slots, said spaced groups of turns of said selectively energizable winding generating wound poles at said certain intermediate slots and generating consequent poles at certain of said spaced groups of slots, and a second selectively energizable winding that has the turns thereof formed as spaced groups of turns, said spaced groups of turns of said second selectively energizable winding being disposed in other of said intermediate slots, said spaced groups of turns of said second selectively energizable winding generating wound poles at said other intermediate slots and generating consequent poles at other of said spaced groups of slots, said spaced groups of turns of the first said selectively energizable winding and said spaced groups of turns of said second selectively energizable winding generating wound poles that have the polarity of the consequent poles of said main running winding and generating consequent poles that have the polarity of the wound poles of said main running winding.

8. A multi-speed electric motor as claimed in claim 7 wherein said intermediate slots are grouped in spaced groups that alternate with said groups of slots.

9. A multi-speed electric motor as claimed in claim 7 wherein said intermediate slots are grouped in spaced groups that alternate with said groups of slots, and wherein the number of slots in each of said group of slots is greater than the number of slots in each group of intermediate slots.

10. A multi-speed electric motor that has a rotor, a stator, a plurality of winding-receiving slots in said stator, a main running winding that has the turns thereof formed as spaced groups of turns, said spaced groups of turns being disposed in groups of slots in said stator that are spaced apart by intermediate slots, said spaced groups of turns generating wound poles at said groups of slots and generating consequent poles at said intermediate slots, a selectively energizable winding that has the turns thereof formed as spaced groups of turns, said spaced groups of turns of said selectively energizable winding being disposed in certain of said intermediate slots, said spaced groups of turns of said selectively energizable winding generating wound poles at said certain intermediate slots and generating consequent poles at certain of said spaced groups of slots, and a second selectively energizable winding that has the turns thereof formed as spaced groups of turns, said spaced groups of turns of said second selectively energizable winding being disposed in other of said intermediate slots, said spaced groups of turns of said second selectively energizable winding generating wound poles at said other intermediate slots and generating consequent poles at other of said spaced groups of slots, said spaced groups of turns of the first said selectively energizable winding and said spaced groups of turns of said second selectively energizable winding generating wound poles that have the polarity of the consequent poles of said main running winding and generating consequent poles that have the polarity of the wound poles of said main running winding, said spaced groups of turns of said main running winding occupying more than one half of the slots in said stator.

11. A multi-speed electric motor that has a rotor, a stator, a plurality of winding-receiving slots in said stator, a main running winding that has the turns thereof formed as spaced groups of turns, said spaced groups of turns being disposed in groups of slots in said stator that are spaced apart by intermediate slots, said spaced groups of turns generating wound poles at said groups of slots and generating consequent poles at said intermediate slots, a selectively energizable winding that has the turns thereof formed as spaced groups of turns, said spaced groups of turns of said selectively energizable winding being disposed in certain of said intermediate slots, said spaced groups of turns of said selectively energizable winding generating wound poles at said certain intermediate slots and generating consequent poles at certain of said spaced groups of slots, and a second selectively energizable winding that has the turns thereof formed as spaced groups of turns, said spaced groups of turns of said second selectively energizable winding being disposed in other of said intermediate slots, said spaced groups of turns of said second selectively energizable winding generating wound poles at said other intermediate slots and generating consequent poles at other of said spaced groups of slots, said spaced groups of turns of the first said selectively energizable winding and said spaced groups of turns of said second selectively energizable winding generating wound poles that have the polarity of the consequent poles of said main running winding and generating consequent poles that have the polarity of the wound poles of said main running winding, said main running winding being selectively connectible directly across a source of voltage and being selectively connectible in series with the first said selectively energizable winding across said source of voltage and being selectively connectible in series with the first said selectively energizable and second selectively energizable windings across said source of voltage.

12. A multi-speed electric motor that has a rotor, a stator, a plurality of winding-receiving slots in said stator, a main running winding that has the turns thereof formed as spaced groups of turns, said spaced groups of turns being disposed in groups of slots in said stator that are spaced apart by intermediate slots, said spaced groups of turns generating wound poles at said groups of slots and generating consequent poles at said intermediate slots, a selectively energizable winding that has the turns thereof formed as spaced groups of turns, said spaced groups of turns of said selectively energizable winding being disposed in certain of said intermediate slots, said spaced groups of turns of said selectively energizable winding generating wound poles at said certain intermediate slots and generating consequent poles at certain of said spaced groups of slots, and a second selectively energizable winding that has the turns thereof formed as spaced groups of turns, said spaced groups of turns of said second selectively energizable winding being disposed in other of said intermediate slots, said spaced groups of turns of said second selectively energizable winding generating wound poles at said other intermediate slots and generating consequent poles at other of said groups of slots, said spaced groups of turns of the first said selectively energizable winding and said spaced groups of turns of said second selectively energizable winding generating wound poles that have the polarity of the consequent poles of said main running winding and generating consequent poles that have the polarity of the wound poles of said main running winding, the total number of turns of the first said selectively energizable and second selectively energizable windings being less than the total number of turns of said main running winding.

13. A multi-speed electric motor as claimed in claim 7 wherein said certain intermediate slots alternate with said certain spaced groups of slots and wherein said other intermediate slots alternate with said other spaced groups of slots.

References Cited in the file of this patent
UNITED STATES PATENTS

| | | |
|---|---|---|
| 661,464 | Aldrich et al. | Nov. 6, 1900 |
| 2,073,532 | Ballman | Mar. 9, 1937 |